United States Patent
Nims et al.

(10) Patent No.: US 7,019,865 B2
(45) Date of Patent: Mar. 28, 2006

(54) METHOD FOR SCALING AND INTERLACING MULTIDIMENSIONAL AND MOTION IMAGES

(75) Inventors: Jerry C. Nims, Atlanta, GA (US); Paul Peters, Savanna, NM (US); William Karszes, Rosewell, GA (US); Wahn Raymer, Doraville, GA (US); Samuel Pol, Lawrenceville, GA (US); Suk Lee, Dunwoody, GA (US)

(73) Assignee: Orasee Corp., Duluth, GA (US)

( * ) Notice: Subject to any disclaimer, the term of this patent is extended or adjusted under 35 U.S.C. 154(b) by 877 days.

(21) Appl. No.: 10/066,648

(22) Filed: Feb. 6, 2002

(65) Prior Publication Data

US 2002/0167679 A1    Nov. 14, 2002

Related U.S. Application Data

(60) Provisional application No. 60/266,441, filed on Feb. 6, 2001.

(51) Int. Cl.
*G06F 15/00* (2006.01)

(52) U.S. Cl. ............................ 358/1.18; 347/2; 358/1.2

(58) Field of Classification Search .............. 358/1.18, 358/1.2
See application file for complete search history.

(56) References Cited

U.S. PATENT DOCUMENTS

| | | | |
|---|---|---|---|
| 5,436,738 A | 7/1995 | Manico | |
| 5,764,231 A | 6/1998 | Ray et al. | |
| 5,924,870 A | 7/1999 | Brosh et al. | |
| 6,026,215 A * | 2/2000 | Fantone et al. | 358/1.2 |
| 6,091,482 A | 7/2000 | Carter et al. | |
| 6,683,699 B1 * | 1/2004 | Ashizaki et al. | 358/1.18 |
| 2002/0113829 A1 * | 8/2002 | Nims et al. | 347/2 |
| 2002/0196466 A1 * | 12/2002 | Peterson | 358/1.18 |

* cited by examiner

*Primary Examiner*—Edward Coles
*Assistant Examiner*—Alan Rahimi
(74) *Attorney, Agent, or Firm*—Patton Boggs LLP

(57) ABSTRACT

A plurality of input digital pixel images, having differing pixel array sizes, are scaled to a plurality of common pixel dimension input images based on a printer resolution value, a data characterizing dimensions of the printed image, and a final size value for at least one of the plurality of digital pixel images. A lenticule resolution data is received. A composite image file is formed of the plurality of scaled input digital pixel images, and at least one left-right image file pair is generated from the composite image file. The left-right image file pair are interlaced and printed on a printer associated with the printer resolution value.

5 Claims, 1 Drawing Sheet

METHOD FOR SCALING AND INTERLACING MULTIDIMENSIONAL AND MOTION IMAGES

Priority of this application is based on U.S. Provisional Application No. 60/266,441, filed on Feb. 6, 2001, which is hereby incorporated by reference herein to the same extent as if full disclosed herein.

STATEMENT OF THE PROBLEM

This invention relates generally to lenticular media and three-dimensional images presented through lenticular media and, more particularly, to methods of receiving multiple pixel-based images having different respective pixel array sizes and resolutions, and scaling the same to a uniform resolution optimized for printer resolution and lenticule resolution, for subsequent interphasing and fixing on a lenticular media.

The use of lenticular lens media to present images appearing as three-dimensional, or as a motion or other change in the visual image as the viewing angle to the media is changed, has been known for more than a half a century. For example, lenticular lens media have been used in advertising campaigns, political campaigns, inserts in cereal boxes, posters, and buttons. Lenticular lens media have gained in popularity and are now becoming commercially viable, as commercial printing presses such as a Heidelberg® or Kamori® can print in mass volume.

The optical physics of lenticular lenses are well known and are described throughout the available literature. An example description is in the Background of the Invention section of U.S. Pat. No. 6,091,482, and FIGS. 3 and 4A of same. The general operation is that various images or frames representing different objects, different positions of one or more objects, or different view angles of a scene, are manipulated and then combined or "interphased", using techniques requiring significant skill in the computer and image processing arts, to create one "fuzzy" digital image. The "fuzzy" image is then fixed on a visual medium such as, for example, a high-resolution printing press. Engaging a printing press of such high resolution is costly, and variables to be considered far exceed that of traditional printing. After the "fuzzy" image is fixed on a printable media, a lenticular lens material is applied, thereby creating a picture appearing to the naked eye as having three dimensions, or a picture which when viewed from a succession of viewing angles by the naked eye, contains motion.

Although the "interlacing" or merging of multiple images to create one "fuzzy" image is within the public domain, the present inventors have identified significant shortcomings in the prior art methods for processing and fixing lenticular images.

One shortcoming is that there is no existing software method enabling a person without significant skill in the art of both image manipulation software such as, for example, Adobe Photoshop®, and of lenticular lens and image theory, to create lenticular (multidimensional and/or motion) images in the home.

Another shortcoming is that the multiple images, i.e., different objects or positions of objects and scenes, must be presized and scaled to a common pixel array size before interlacing into a merged file. Then, after interlacing, the merged file must be rescaled to match the image area and resolution of the output media. There are multiple potential problems inherent to the double resealing identified above. One is that the first resealing is not based on the resolution of the output media (or output device); it is based on an arbitrary pixel array or on the largest array size from among the multiple images being merged. Another problem is that the second resealing operates on the merged file, which can be very large. This can severely burden or exceed the memory resources of home computers. This problem exists even when the multiple images to be interphased have the same scale and pixel array size, because the resealing to match the output device is still performed on the merged file which, as identified, can be very large.

U.S. Pat. No. 5,924,870 ("the '870 patent") discloses a method exemplifying some of the particular shortcomings identified above. The '870 patent is directed to a method for processing tone and linework portions within lenticular images. The '870 patent recites that it can receive input images of any resolutions and size, and produce output suitable for a particular resolution device. The methods described by the '870 patent for performing the operations does not avoid the above-described shortcomings. The input images are described as having the same resolution and size. The rescaling, and dithering if necessary, is performed on the merged file. An example operation described by the '870 patent inputs twelve images with a resolution of 640 pixels wide by 480 pixels high. The lenticular lens is described as 66.66 lenticules per inch, with each image 8.8 inches wide and 6.6 inches high. During the interlacing, each image is converted to 792 pixels or dots per inch, i.e., 66 times 12, resulting in a composite image that is 8.8 inches wide by 6.6 inches high at 792 dots per inch resolution. As described by the '870 patent, the composite image resolution is changed to match the resolution of the output device. Then the output device matched image is further processed to match the lenticular lens by making an adjustment to the size of the image.

U.S. Pat. No. 6,091,482 ("the '482 patent") discloses another method exemplifying some of the particular shortcomings identified above. The '482 patent is also directed to a method for processing tone and linework portions within lenticular images. The '482 patent recites that input images may have different pixel array sizes. For such a situation, the '482 patent recites a first step of reforming the images to a uniform file size, using Adobe Photoshop® or QuarkXPress®. According to the '482 patent, the reformed uniform files are interlaced using Postscript from Adobe Systems. Lastly, the composite or merged image is modified or adjusted, i.e., rescaled, to accommodate the particular lens. As discussed hereinabove, the composite or merged file is typically very large. The '482 method does not address the printer resolution or whether the composite image must be further processed to accommodate the same.

SUMMARY OF THE INVENTION

The present invention advances the art with methods in which one or more digital images are transferred to a digital computation apparatus, for example a general purpose programmable digital computer, with digital parameter values characterizing the resolution of a printer, the dimensions of a desired printed composite image, the dimensions of one or more desired printed images corresponding to each of the one or more digital images, and parameter values describing a lenticular media on which a composite image based on the input pixel-based images, will be printed. A first embodiment includes a method in which the general purpose digital computer calculates the number of pixels in each of a scales each of the These and other objectives are attained by a method wherein individual images are rescaled individually before interphasing into a composite image. The rescaling is based on the printer resolution, such that each image input into the final image is scaled to ensure that the number of lines under each lenticule is maximized. Images are rescaled to achieve the highest resolution possible using the user's hardware.

An objective of the present invention is to provide a method by which a layperson can create quality, inexpensive, and easily constructed lenticular 3D and/or motion images similar to those produced on commercial printing presses and/or commercial ink jet printers.

Another objective is a software based method for receiving multiple input images, scaling the inputs in accordance with the user's desired output resolution, and then interlacing the multiple images into a merged "fuzzy" image without expertise with manipulation software such as Photoshop®.

A further objective is a software based method for receiving multiple input images, scaling the inputs in accordance with the user's desired output resolution, without having to perform scaling operations on a very large merged file, and then interlacing the appropriately scale multiple images into a merged "fuzzy" image for printing and overlaying by a home user.

A further objective is a method allowing for the use of any quality of input image.

A still further objective is a method for the production of a three-dimensional or multi-object output image with any quality of output device.

According to a first aspect of the invention, the rescaling of individual images prior to merging into a composite image is such that, in the direction of the lenticules, the number of pixels equals the size of the image in that dimension (horizontal or vertical, depending on the desired three-dimensional or motion effect) multiplied by the printer's resolution. The number of pixels for each image in the across-lenticule direction is the printer resolution times the size of the image divided by the number of images that are interlaced for printing. Therefore, the rescaled size (in pixels) of each image is equal to the number of pixels desired in the final image divided by the number of images used to achieve the desired motion or three-dimensional result.

These and other objects, features and advantages of the present invention will become more apparent to, and better understood by, those skilled in the relevant art from the following more detailed description of the preferred embodiments of the invention taken with reference to the accompanying drawings, in which like features are identified by like reference numerals.

DETAILED DESCRIPTION OF THE INVENTION

1. Overview

Figure 1:
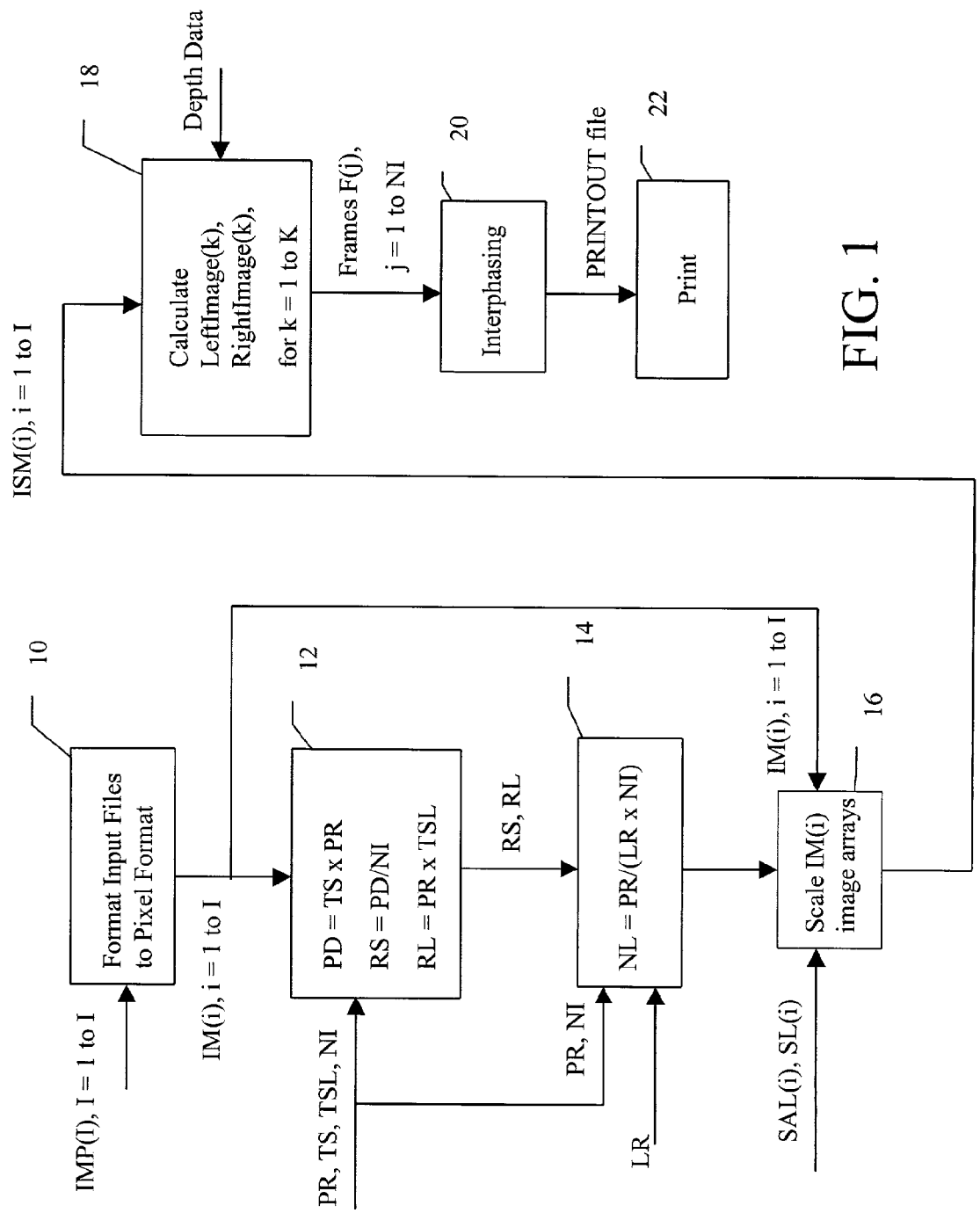
FIG. 1 is an example functional flow chart of a preferred method according to the invention.

The methods according to the described present invention can be carried out on any of a large variety of standard commercially available general purpose programmable digital computers (not shown) having, for example, a standard protocol digital input port, a microprocessor, operating system storage, operating system software stored in same, application program storage, data storage, a standard protocol digital output port, a user interface, and a video screen. An example computer is a Dell® model Optiplex® GX 150 having a 1 GHz Intel® Pentium® III or Celeron® microprocessor, 528 MByte RAM, a 60 GByte hard drive, a 19 inch conventional cathode ray tube (CRT) video display, and a standard keyboard and mouse for user entry of data and commands, running under Microsoft Windows 2000® or Windows XP® operating system. Other examples include an Apple® iMac® having an 800 MHz G4 microprocessor, 528 MByte RAM, a 60 GByte hard drive, a 15 inch LCD flat screen display, and a standard Apple-format keyboard and mouse, running under the Apple OSX or OS9 operating system.

The examples above are only for purposes of illustration, as it will be understood that the invention is not limited to, or defined in accordance with the particular computing hardware, or system, on which it is carried out. For example, persons of ordinary skill in the art to which this invention pertains can readily identify numerous general purpose programmable computers at least equivalent to the examples identified above, available from numerous vendors. Further, such computers may run under other operating systems such as, for example, Sun® Solaris® and Linux®), and out the preferred embodiments of the invention. In addition, all of the described methods may be carried out utilizing, for example, a thin-client system, or over the Internet, with a user entering commands or data through an Internet browser, and uploading it to a remote web site for processing in accordance with the described methods.

To provide ready description of, and enable understanding of the invention, unnecessary description of particular software code is omitted and, instead, the invention is described in terms of functional blocks readily implemented upon reading this disclosing, using standard codewriting methods.

2. Detailed Description of the Preferred Embodiments

FIG. 1 shows an example flow chart of a method according to a first embodiment of the invention. It will be understood that the FIG. 1 flow chart has a functional block breakdown, and ordering, for purposes of describing the method. Depending on design choice in an actual implementation of a method within the scope of this embodiment, the order and breakdown of machine operations, and of software modules, if used, may depart from that depicted in FIG. 1.

The method according to this embodiment of the invention will be described in reference to an example running on the FIG. 1 functional flow chart. The specific example begins with three input image files, the first representing a visual image of Peter Parker, the second being Spiderman® and the third image being a storefront. The generated product is a file, labeled PRINTOUT, formatted for output to a printing device, preferably an inkjet printer. When the PRINTOUT file is printed on a lenticular medium the image it creates, labeled INKPRINT, presents a viewer with a three dimensional image having, as an example, Peter Parker in a reference plane in front of the storefront background and Spiderman in the foreground.

For ease of reference the direction across the lenticules (not shown) will be identified hereinafter as the "cross-lenticule" direction, and the direction in which the lenticules extend will be identified as the "lenticule-extending" direction.

Step 10: Input Plurality of Pixel Images

Input plurality of digital images IMP(i), for i=1 to 1;

Decompress, if necessary, to convert to pixel form; and

Store as individual pixel files IM(i), for i=1 to I.

The first step of the FIG. 1 example flow diagram, represented by the functional block labeled as "10", inputs image files IMP(i), for i=1 to I, with I equal to the number of image files. Typically, the file would have a visible object or scene that the user desired to include in the final three-dimensional image. For example, one of the IMP(i) files could be a shark, another a person, and another an underwater scene, for forming a three-dimensional composite image of the person and the shark underwater.

The files IMP(i) may be in any digital format, proprietary or open, including, but not limited to ".jpg", ".bmp", ".tif" and ".pdf". Each of the files IMP(i), for i=1 to I, is then decompressed, if necessary, and converted into a pixel form which is stored as IM(i). Decompression and conversion from both proprietary and open formats, including ".pdf", ".jpg" and ".tif" is readily performed using decompression and conversion software available from numerous vendors such as, for example, Adobe® and Macromedia®.

Each pixel file IM(i), for i=1 to I will have a pixel dimension, labeled herein as N,M (i), for i=1 to I, where N equals the number of pixels in, for example, the horizontal direction and M equals the number of pixels in a direction perpendicular to the N direction which, if N is horizontal, will be vertical. The labels "horizontal" and "vertical" are for purposes of reference only, and do not define the orientation of objects within the IM(i) image.

It will be assumed for the example of Peter Parker, Spiderman and the storefront that Peter Parker is the IMP(1) image, Spiderman is the IMP(2) image, and the storefront is the IMP(3) image. It will be assumed that all three images were in ".jpg" format. After decompression and conversion to the IM(i) files, it will be assumed that the pixel array for the Peter Parker image, which is IM(1), has a dimension of 256×256 pixels, as does IM(2), the image for Spiderman, and IM(3), the pixel image for the storefront, will be assumed to have a dimension of 512×512 pixels. Therefore, for this particular example, N,M(1) has a value of 256,256, N,M(2) has a value of 256,256 and N,M(3) has a value of 512,512.

An variant of step 10 extracts a plurality of Q pixel files IM(i,q), with the q index ranging from 1 to Q, from at least one of the input files IMP(i). For example, a user may input a file IMP(i) having a horse, a car, and skateboard and, using commercially available software, extract the image of the horse and the image of the car as separate input pixel files. In addition, one or more of the extract pixel files, or the entire input image file IMP(i), may be stored in an image palette file (not shown) for subsequent use in other INK-PRINT images.

Step 12: Calculate Rescale Array Size RS and RL input PR value, or read PR from a standard computer printer driver file, where PR is equal to the printer resolution in dots per inch (DPI);

input value of TS, the INKPRINT image dimension in the direction across the lenticules;

input value of TSL, the INKPRINT image dimension in the extending direction of the lenticules;

calculate the number of pixels desired, PD, in the direction across the lenticules, according to:

$$PD=TS \times PR;\qquad\text{Equation (1)}$$

Calculate RS, which is the Rescale Array Size in the cross-lenticule direction, according to:

$$RS=PD/NI, \text{ where NI=number of frames or viewing images; and}\qquad\text{Equation (2)}$$

Calculate RL, which is the Rescale Array Length in the lenticule-extending direction according to:

$$RL=PR \times TSL.\qquad\text{Equation (3)}$$

Step 12, shown as the second step in the FIG. 1 example flow diagram, calculates an interphased printed image pixel dimension PD, a Rescale Array Size, or RS, and a Rescale Array Length, or RL. PD, RS and RL define pixel dimensions of the PRINTOUT file generated by steps described further below. PD and RS also define the number of pixels in the INKPRINT image, in the cross-lenticule direction of the lenticular medium which overlays it and which it is seen through.

PD is the total number of pixels within the INKPRINT image in the cross-lenticule direction. PD is the product of the printer resolution, labeled PR, which is in dots per inch, and TS, which is the linear dimension of the desired INKPRINT in the cross-lenticule direction.

RS is the number of pixels in each of the NI viewing images or frames, and is equal to PD divided by NI. The term "frame" is used herein as a generic reference to interlaced images within the INKPRINT image, and these images or frames generated for this embodiment at step 18. Frames are collectively referenced by the label "F" and particular frames are referenced herein as F(j), with the index "j" ranging from 1 to NI. For example, as described in greater detail below, if a single viewing angle three-dimensional image is desired then two frames are needed, one for the left eye image and one for the right eye image. Using the example reference labels used herein, the value of NI would be two, with F(1) being the left eye image and F(2) being the right eye image. The frames F(1) and F(2) would then be rasterized and interlaced at step 20, as described below.

For example, as described in greater detail below, if a single viewing angle three-dimensional image is desired then two frames are needed, one for the left eye image and one for the right eye image. RL is the number of pixels in the lenticule extending direction, which is equal to the TSL length in that direction of the INKPRINT image multiplied by the printer resolution PR.

The rescale array size RS according to the above formula is used by subsequent described steps to scale the pixel array dimensions of the PRINTIMAGE file to better exploit the full output resolution of the printer (not shown) that is used to print the PRINTIMAGE file as the INKPRINT image. Further, as will be understood, the RS and RL values are used by the subsequent described steps to rescale the pixel dimensions of each input image IM(i) individually, prior to the combining the IM(i) files into a composite file, which is also described further below.

Applying step 12 to the Peter Parker, Spiderman and storefront image example, it is assumed that a 6 inch (TS) by 8 inch (TSL) INKPRINT image is desired, appearing three dimensional seen from a single viewing angle through a lenticular medium. It will also be assumed, for this example, that the printer resolution, or RS, value is 760 dots per inch. Plugging into Equation (1) above, the value of PD for the example is equal to 760×6, which is 4630 pixels. Plugging into Equation (2) the number of pixels in each of the left eye image and right eye image, RS, is 4630/NI, which is 4630/2, which is equal to 2315 pixels. The number of pixels RL in the lenticule-extending direction, using Equation (3), is 760×8, which is 6040 pixels.

Step 14: Calculate Optimum Number of Lines Per Lenticule

Step 14, shown as the third step in the FIG. 1 example flow diagram, calculates an optimum number of lines per lenticule, NL, which is the same for each of the NI frames F, as follows:

Input LR, where LR=lenticular resolution in lenses per inch (LPI)

Calculate NL, which is the number of lines under each lenticule (not shown), for each frame F according to $$NL=PR/(LR \times NI).\qquad\text{Equation (4)}$$

As stated above, the label "frame" is used herein as a generic reference to the interlaced images within the INKPRINT image, which are generated for this embodiment at step 18. The frames F are rasterized and interlaced at step 20, as described below. The value of NL is ultimately limited by the resolution, or PR, of the user's printer. The NL value calculated by the above formula optimizes the line count under each lens in view of the PR limitation. Unless otherwise stated, the meaning of a "line" is a dot width line in the lenticule-extending direction.

For example, assuming an LPI of 60, and a PR of 760 DPI, the maximum number of lines under each lenticule is 760/60, which equals 12. Assume a single-viewing angle three-dimensional image, which means there are two frames interlaced with one another, a left eye image frame and a right eye image frame, with NI=2. According to Equation (4), NL, the number of lines under each lenticule for each of the two frames is 760/(60×2), which equals 6.

Step 16: Size Rescaling of the Individual IM(i) Image Files

Step 16, shown as the fourth step in the FIG. 1 example flow diagram, rescales each of the input image files IM(i) in accordance with the visual size that IM(i) should have in the INKPRINT image, and the above-calculated values of PD and RS, as follows:

Input SL(i), for i=1 to I, to assign the final image size in the lenticular-extending direction for each of the IM(i) images;

Input SAL(i), for i=1 to I, to assign the final image size in the cross-lenticular direction for each of the IM(i) images;

Calculate the pixel dimension NPL(i), in the lenticular-extending direction, based on the input SL(i) value and the printer resolution value PR, according to $$NPLI(i)=SL(i)\times PR, \text{ for } i=1 \text{ to } I\qquad\text{Equation (5)}$$

Calculate the pixel dimension NPR(i), in the cross-lenticular direction, based on the input SAL(i) value and the, according to $$NPRI(i)=SAL(i)\times(PR/NI), \text{ for } i=1 \text{ to } I\qquad\text{Equation (6)}$$

Generate a scaled array ISM(i), for i=1 to I, for each of the I input image files, based on NPR(i) and NPL(i).

Equations (5) and (6) rescale each of the input image pixel files IM(i) to a scaled pixel array file ISM(i), for i=1 to I, based on user input parameters SL(i) and SAL(i) before making the composite image. Since the PR value is, for this description, in DPI, or dots per inch, the SL(i) and SAL(i) values are in inches.

Each of the ISM(i) files may be considered as having a total dimension of RS pixels in the cross-lenticular direction and RL pixels in the lenticule-extending direction. All of the pixels in each of the ISM(i) files are zero-valued, however, except for the NPR(i) pixels in the cross-lenticular direction and the NPL(i) zero pixels in the lenticule-extending direction. Each ISM(i) file therefore represents the user's desired size for its image, with the pixel spacing matched to the RS and RL dimensions calculated at step 12 that the Therefore, the actual image file within each ISM(i) file consists of an array of NPR(i) by NPL(i). The zero-valued pixels allow the ISM(i) files to be placed in respective planes overlaying one another, without pixels in a foreground plane outside of actual image obstructing actual image pixels behind the foreground. Typically the zero-valued pixels are not stored, to conserve storage (not shown) of the computer apparatus.

Scaling the input images individually to have both the desired physical size within the INKPRINT image and to match the printer resolution PR is superior to scaling a composite from which the PRINTFILE because of smaller file sizes. Further, with the images being scaled individually, the input images need not be the same exact size. Images of different sizes have a ratio applied to scale them to the same dimension as defined by the user before interlacing (interphasing).

For the example of Spiderman, Peter Parker and the storefront it is assumed that the entire image background of the final INKPRINT image will be the storefront. The user would therefore input an SAL(3) value of 6 inches and an SL(3) value of 8 inches. ISM(3), the scaled input image file corresponding to the storefront will therefore be rescaled by this step from a 512 by 512 array to have NPR(3)=2315, meaning 2315 pixels in the cross-lenticule direction, and NPL(3)=6040, meaning 6040 pixels in the lenticule-extending direction. The scaling is performed using pixel-resolution translation or spatial resampling methods known in the art, including, but not limited to the nearest-neighbor method, bilinear interpolation, and bicubic interpolation. It will be assumed that the both the Spiderman and the Peter Parker image will have a cross-lenticule dimension of 1 inch and a lenticule extending dimension of 4 inches in the INKPRINT image. The user would therefore input SL(1)=4 inches, SAL(1)=1 inch, SL(2)=4 inches and SAL(2)=4 inches. Using Equations (5) and (6), the scaled array ISM(1) for Peter Parker and ISM(2) for Spiderman would be according to NPR(1)=385 (rounded down to an integer), NPL(1)=3020, NPR(2)=385 (rounded down to an integer) and NPL(2)=3020.

Step 18: Calculate Left and Right Scene Images

Step 18, shown as the fifth step in the FIG. 1 example flow diagram, calculates a plurality of left and right image files, labeled as ImageLeft(k), and ImageRight(k), for k=1 to K, where K is equal to the number of angles at which the viewer will see three dimensions through the lenticular medium. ImageLeft(k) is a left eye image and ImageRight(k) is a right eye image, for the $k^{th}$ viewing angle. For three-dimensional imaging K is equal to NI/2. The left eye image and right eye image corresponding to ImageLeft(k) and ImageRight(k) are the scene as if observed from a hypothetical viewer's left eye and right eye, respectively, at a particular viewing angle corresponding to the $k^{th}$ viewing angle. The difference between the ImageLeft(k) and ImageRight(k) corresponds to the parallax that would exist between the hypothetical viewer's left eye and right eye image if he or she were actually viewing the image in three dimensions from that $k^{th}$ viewing angle. The ImageLeft(k), and ImageRight(k) are specific values for the frames F(j), for j=1 to NI. For example, if K=3, meaning that there are three viewing angles, then three pairs of ImageLeft(k) and ImageRight(k) are generated. NI, the number of frames F, is therefore six.

The method for calculating the left and right scene images is described by Applicant's co-pending application Ser. No.

09/616,070, entitled, Multi-Dimensional Image System for Digital Image Input and Output, which is hereby incorporated by reference.

For the three dimensional example of Peter Parker, Spiderman and the storefront background, an example method for calculating a left eye and a right eye alignment between the scaled array for each of Peter Parker, Spiderman and the storefront background will be described. For the example it is assumed that ISM(1) is a scaled pixel array file corresponding to Peter Parker, ISM(2) is a scaled pixel array file corresponding to Spiderman, and ISM(3) is a scaled pixel array file corresponding to the storefront. It is also assumed that there only is one viewing angle and, therefore K=1.

ImageLeft(1) is formed by arranging, using a "left eye" position, the ISM(1) (Peter Parker) file within a pixel plane P1, having RS by RL dimensions, with all pixels outside of the ISM(1) boundary being zero-valued to appear transparent when placed over any other image pixel in another plane. For this example, plane P1 is the foreground. ISM(2) (Spiderman) is arranged within a "key" plane P2, according to the "left eye" alignment relative to ISM(1) in P1. Lastly, ISM(3) (the storefront) is arranged within a background plane P3, also according to the "left eye" alignment relative to ISM(1) in P1 and ISM(2) in P2. The overlay of P1 having ISM(1), P2 having ISM(2), and P3 having ISM(3), aligned according to the "left eye" view, is ImageLeft(1).

Likewise, ImageRight(1) is formed by arranging, using a "right eye" position, the ISM(1) (Peter Parker) file within a pixel plane P1, having RS by RL dimensions, with all pixels outside of the ISM(1) boundary being zero-valued to appear transparent when placed over any other image pixel in another plane. ISM(2) (Spiderman) is arranged within the "key" plane P2, according to the "right eye" alignment relative to ISM(1) in P1. ISM(3) (the storefront) is arranged within the background plane P3, also according to the "right eye" alignment relative to ISM(1) in P1 and ISM(2) in P2. The overlay of P1 having ISM(1), P2 having ISM(2), and P3 having ISM(3), aligned according to the "right eye" view is ImageRight(1).

Step 20: Interphasing

Step 20, shown as the sixth step in the FIG. 1 example flow diagram, interlaces or interphases the file (j), for j=1 to NI, which are the ImageLeft(k) and ImageRight(k) pixel files, for k=1 to K, in a raster fashion, in an alternating or interlaced line pattern, the pattern depending on the value of K and the number of lines per lenticule. The interphased file is labeled PRINTFILE. The PRINTFILE accounts for, and is optimized for, the user's printer resolution PR, the lines per inch resolution LPI of the lenticular layer, and the size TS of the final product. The method for interphasing is described by Applicant's co-pending application Ser. No. 09/616,070, entitled, Multi-Dimensional Image System for Digital Image Input and Output, which is hereby incorporated by reference.

For the Spiderman, Peter Parker and storefront example it will be assumed that NL, the number of lines per lenticule is equal to 12, and that the lenticule resolution is 60 LPI. RS, the number of pixels in each of the frames F was calculated at step 12 to be equal to 2315 pixels. Frame F(1), for this example, is lmageLeft(1) and frame F(2) is ImageRight(1). The Frames F(1) and F(2) are interphased to have six pixels from F(1) followed by six pixels from F(2), followed by six pixels from F(1), and so on, thereby generating the PRINT-FILE. The number of pixels RL in the lenticule-extending direction was calculated to be 6040 pixels. The output step 22 below translates the PRINTILE such that the first twelve pixels are under the first lenticule, and the next twelve pixels are under the second lenticule, and so on. Each set of twelve pixels is arranged as six pixels from frame F(1), i.e., the left eye image of Spiderman, Peter Parker and the storefront, followed by six pixels from frame F(2), i.e., the right eye image of Spiderman, Peter Parker and the storefront.

Step 22: Output

Next, at the functional block labeled 22 in FIG. 1, the user inputs an instruction causing the computer (not shown) to output the PRINTFILE to a printer (not shown), preferably having the PR print resolution. The printer then prints the INKPRINT image (not shown in the drawings) on, for example, an ink-receptive surface (not shown) on the back of a lenticular medium (not shown). Alternately, the INKPRINT image maybe printed on paper (not shown), onto which a lenticular sheet (not shown) having an adhesive backing is aligned and adhered.

The printer (not shown) may be remote from the user's computer (not shown) or terminal (not shown). For example, the user may input the picture files IMP(i) into his or her computer and then log onto a web site (not shown). The user would then access, or select, one or more printers (not shown) through the web site. The access may, for example, include the user viewing a selection printers having, for example, a range of resolutions. He or she would click on, for example, an icon (not shown) representing the desired printer. The user's browser would then, for example, download a resolution value PR for that particular printer and store it in the user's computer. Implementation of a web site usable with, for example a conventional web browser, to perform these described operations is readily carried out by one of skill in the web site design arts using any of the commercially available web site designing and development tools. The user would then go through steps 10 through 18 and transfer the finished file to the web site. He or she would then submit payment information using, for example, known Internet credit card information protocols, and a printing resource having the desired printer and lenticular medium would then manufacture the hard copy product (not shown) and send it to the user.

Those skilled in the art understand that the preferred embodiments described above may be subjected to apparent modifications including, but not limited to, implementations with digital processing, networking and storage hardware equivalent to those explicitly described, without departing from the true scope and spirit of the invention, and that the particular embodiments shown in the drawings and described within this specification are for purposes of example and should not be construed to limit the invention as set forth in the claims below.

We claim:

1. A method for generating images for display through a lenticular medium, comprising steps of:

inputting a plurality of digital image files into a storage medium, each having a respective pixel dimension in a first direction and a respective pixel dimension in a second direction;

inputting a printer resolution data into a storage medium;

inputting a lenticular resolution data into a storage medium;

inputting a print image size data into a storage medium;

inputting into a storage medium a frame number representing a number of viewing angles;

inputting into a storage medium a depth value data corresponding to at least one of said plurality of pixel images;

calculating an output image dimension data representing a pixel dimension in said first direction and a pixel dimension in said second direction, said calculating based on said printer resolution data, said print image size data, and said viewing angle number data;

inputting a print object dimension data corresponding to at least one of said input pixel images, said print object dimension data corresponding to a printed dimension of a printed image corresponding to said input pixel image;

generating a plurality of scaled input pixel image files, each based on said output image dimension data, a corresponding one of said print object dimension data;

generating a left composite frame file having said plurality of scaled pixel image files combined according to a first alignment;

generating a right composite frame file having said plurality of scaled image files combined in a second alignment, said second alignment and said first alignment having a relation in accordance with at least said depth value data; and generating an interphased pixel file based on said left composite image file and said right composite image file.

2. A method as in claim 1, further comprising the steps of:

calculating a lines-per-lenticule data based on said print printer resolution data and said frame number;

generating print output file based on said interphased pixel file and on said lines-per-lenticule data;

outputting the print output file to a printer associated with the printer resolution data; and printing an image, using said printer, on a lenticular medium.

3. A method as in claim 1, wherein said step of inputting a plurality of digital image files into a storage medium includes inputting a primary digital image file and extracting one or of said plurality of digital image files from said primary digital image file.

4. A method as in claim 1, wherein said step of inputting a printer resolution data into a storage medium comprises steps of:

accessing a data representing a plurality of printer resources and a corresponding plurality of available printer resolution data associated;

receiving a user generated printer selection command selecting one of said plurality of printer resources;

generating the printer resolution data for inputting into the storage medium based on the user generated selection command.

5. A method as in claim 2, wherein said step of inputting a printer resolution data into a storage medium comprises steps of:

accessing a data representing a plurality of printer resources and a corresponding plurality of available printer resolution data associated;

receiving a user generated printer selection command selecting one of said plurality of printer resources;

generating the printer resolution data for inputting into the storage medium based on the user generated selection command.

* * * * *

UNITED STATES PATENT AND TRADEMARK OFFICE
CERTIFICATE OF CORRECTION

PATENT NO. : 7,019,865 B2  
APPLICATION NO. : 10/066648  
DATED : March 28, 2006  
INVENTOR(S) : Jerry C. Nims et al.

Page 1 of 1

It is certified that error appears in the above-identified patent and that said Letters Patent is hereby corrected as shown below:

On the Title page item (75), should read as follows:  
Jerry C. Nims, Atlanta, GA (US); Paul Peters, Suwanee, GA (US); Kurt Peters, Albuquerque, NM (US); William Karszes, Rosewell, GA (US); Wahn Raymer, Doraville, GA (US); Samuel Pol, Lawrenceville, GA (US); Suk Lee, Dinwoody, GA (US)

Signed and Sealed this

Twenty-sixth Day of August, 2008

JON W. DUDAS  
*Director of the United States Patent and Trademark Office*